Nov. 1, 1966 J. HENRY 3,283,222

ZINC OXIDE TRANSISTOR WITH POTASSIUM HYDROXIDE TREATED PAPER COLLECTOR

Filed July 1, 1963

INVENTOR

JEAN HENRY

BY Young & Thompson

ATTYS.

United States Patent Office 3,283,222

Patented Nov. 1, 1966

3,283,222

ZINC OXIDE TRANSISTOR WITH POTASSIUM HYDROXIDE TREATED PAPER COLLECTOR

Jean Henry, Rhode-St. Genese, Belgium, assignor to Societe d'Etudes, de Recherches et d'Applications Pour l'Industrie S.E.R.A.I., Brussels, Belgium Filed July 1, 1963, Ser. No. 292,039
Claims priority, application Belgium July 10, 1962
7 Claims. (Cl. 317—235)

This invention relates to semiconductor devices.

It is known that a device, in which a sensitive layer comprising a semiconductor and a binding agent is applied on a paper support and connected in an electrical circuit between a first contact member electrically connected to the sensitive layer and a second contact member connected to the paper support, has rectifying properties.

The present invention uses this principle and has for its object the manufacture of industrially useful semiconductor devices.

According to this invention, electron collecting or catching centers are voluntarily inserted into a device as described above, either into the support of the sensitive layer or into an additional layer inserted between the support of the sensitive layer and the contact member electrically connected thereto.

The applicant has found that the rectifying properties of the above known device are surprisingly improved when an additional layer containing electron catching centers is inserted between the support of the sensitive layer and the contact member electrically connected thereto.

The device according to this invention may be a diode or may be part of a more complex assembly comprising possibly two devices of said type connected back to back and forming a transistor together with an intermediate contact member.

The layer which may receive the electron catching centers, provided according to the invention, is preferably constituted by a material capable of absorbing and retaining liquids containing the electron catching elements. This material is conveniently a cellulosic material in the form of a fibrous web, a fabric (woven or not) or paper. However, it is also possible to use inorganic or organic absorbing materials, such as sintered materials, ceramics and foamed resins, such as polystryrene, polyurethane and the like.

The electron catching elements may be obtained by treating an element of the device, such as the support or an additional layer, by means of an alkaline substance, such as an inorganic base, e.g. the alkaline or alkaline-earth metal or ammonium hydroxides or carbonates, or an organic base such as amines.

The semiconductors contained in the sensitive layer or layers may be any N type semiconductors, such as zinc oxide, zinc sulfide, germanium and the like.

Figure 1:
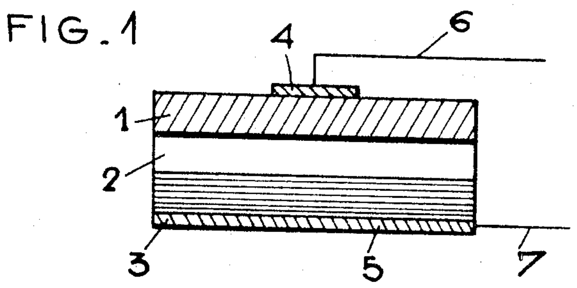
Figure 2:
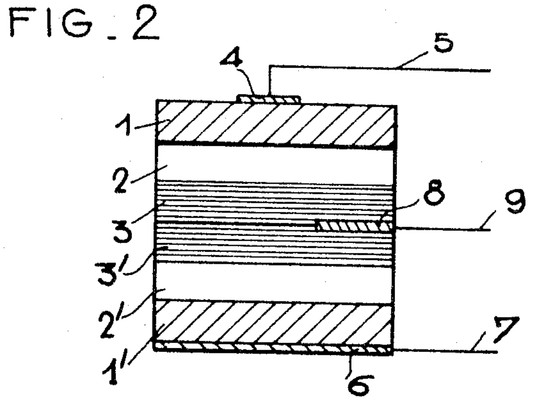

Two embodiments of semiconductor devices according to this invention will now be described in connection with the diagrammatic drawings, in which:

FIGURE 1 shows a semiconductor device according to the invention under the form of a diode, and FIGURE 2 shows diagrammatically a semiconductor device under the form of a transistor.

In FIGURE 1, the reference 1 shows a sensitive layer constituted by fine particles of a semiconductor such as zinc oxide, distributed in a binding agent such as a copolymer of vinyl acetate and vinyl stearate. Said sensitive layer is coated on a support 2, which is conveniently a paper support. This support 2 is in contact with an additional layer 3 which is constitued by a porous paper sheet containing electron catching centers obtained by impregnating said layer 3 by means of a 1 N solution of potassium hydroxide during several hours, the impregnated sheet being finally dried.

Contact members 4 and 5, to which are respectively connected leads 6 and 7, are respectively in contact with the sensitive layer 1 and with the additional layer 3.

In the diode shown on FIGURE 1, the layer 3 may be omitted. In this case, the support bears, on the surface in contact with contact member 5, electron catching centers. The support 2 may also be omitted in the device shown in FIGURE 1. In this case, the sensitive layer is a self-supporting layer containing particles of a semiconductor distributed in a binding film.

FIGURE 2 shows a transistor comprising two assemblies placed back to back, each assembly comprising a sensitive layer 1, 1′ containing particles of a semiconductor such as zinc oxide distributed in a binding organic resin, a support 2, 2′, for example a paper support, for the sensitive layer 1, 1′, as well as two additional layers 3 and 3′ containing electron catching centers. A contact member 4 is connected to the sensitive layer 1, whereas a contact member 6 is connected to the sensitive layer 1′. A third contact member 8 is connected to the additional layers 3 and 3′. To the contact members 4, 6 and 8 are respectively connected leads 5, 7 and 9.

In a first modification of the transistor device of FIGURE 2, the additional layers 3, 3′ may be suppressed, provided that the supports 2, 2′ have been suitably treated so as to carry, on the face thereof opposite to the sensitive layer 1, 1′, electron catching centers. For this purpose, the supports 2 and 2′ may be treated in the same or in a different way, for example by means of two different bases or by means of the same base at different concentrations. In other words, the supports 2 and 2′ may be treated by means of bases of different nature or by means of different quantities of the same base.

In a second modification of the transistor shown in FIGURE 2, the two additional paper layers 3, 3′ containing the electron catching centers, are replaced by a single layer to which the contact member 8 is connected.

In a third modification of the transistor shown in FIGURE 2, the supports 2 and 2′ are omitted, whereas at least one additional layer 3, 3′ containing electron catching centers is provided, said additional layer 3 and/or 3′ acting also as a support for the sensitive layers 1, 1′.

The invention is not limited to the above described embodiments, since many changes may be made in said embodiments within the scope of the invention as defined in the following claims.

What I claim is:

1. A semiconductor device comprising at least two layers (1, 2), the first layer comprising an active layer (1) consisting of a fine powder of a semiconductor dispersed in an organic electrically insulating binder, the second layer comprising a supporting layer (2) consisting of an inert cellulosic material, two contacts (4, 5), one of said contacts being connected to said first layer (1) and the other of said contacts being connected to said second layer (2), and particles of an ionizable substance acting as electron catching centers carried by said device in the vicinity of said other contact.

2. A semiconductor device as in claim 1, in which the particles of the ionizable substance are contained in an additional layer (3) made of an inert cellulosic material, said additional layer (3) being disposed between the support layer (2) and said other contact.

3. A semiconductor device as claimed in claim 1, in which the ionizable substance is an alkaline compound.

4. A semiconductor device as claimed in claim 1, in which said first layer is a light-sensitive layer.

5. A semiconductor device comprising two active layers (1, 1') made of a fine powder of a semiconductor in an organic electrically insulating binder, at least one support layer (3, 3') for said active layers (1, 1'), said support layer containing particles of an ionizable substance acting as electron catching centers, the device comprising also at least three contact members (4, 6, 8), two (4, 6) of said contact members being each electrically connected to a separate active layer (1, 1'), whereas the third contact member (8) is electrically connected to the support layer (3, 3').

6. A semiconductor device as claimed in claim 5, in which the ionizable substance is an alkaline compound.

7. A semiconductor device as claimed in claim 5, in which the semiconductor is zinc oxide.

References Cited by the Examiner

UNITED STATES PATENTS

| | | | |
|---|---|---|---|
| 2,887,632 | 5/1959 | Dalton | 317—238 |
| 3,158,506 | 11/1964 | Ellison | 117—216 |

JOHN W. HUCKERT, *Primary Examiner.*

M. EDLOW, *Assistant Examiner.*